(12) United States Patent
Kim et al.

(10) Patent No.: US 11,199,702 B2
(45) Date of Patent: Dec. 14, 2021

(54) HEADS-UP DISPLAY DEVICE

(71) Applicant: LG Display Co., Ltd., Seoul (KR)

(72) Inventors: SungWoo Kim, Seoul (KR); SungMin Jung, Seoul (KR); YoungBok Lee, Paju-si (KR); JuSeong Park, Goyang-si (KR); Myung-Soo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 115 days.

(21) Appl. No.: 16/206,449

(22) Filed: Nov. 30, 2018

(65) Prior Publication Data

US 2019/0196189 A1 Jun. 27, 2019

(30) Foreign Application Priority Data

Dec. 27, 2017 (KR) .................. 10-2017-0181184

(51) Int. Cl.
*G03H 1/00* (2006.01)
*G02B 27/01* (2006.01)
*B60K 35/00* (2006.01)
*G02B 30/27* (2020.01)

(52) U.S. Cl.
CPC .......... *G02B 27/0103* (2013.01); *B60K 35/00* (2013.01); *G02B 30/27* (2020.01);
(Continued)

(58) Field of Classification Search
CPC ............... G02B 27/0103; G02B 27/01; G02B 27/0101; G02B 27/0105; G02B 27/0107; G02B 27/0172; G02B 30/20; G02B 30/26; G02B 30/27; G02B 5/32; G02B 2027/0134; G02B 2027/013; G02B 2027/0132; G02B 2027/132; G02B 2027/127; G02B 2027/0141; G02B 2027/0138; G02B 2027/014; G02B 2027/0118; G02B 2027/0174; G02B 2027/0185; B60K 35/00; B60K 2370/15; B60K 2370/152; B60K 2370/1529; B60K 2370/1531; B60K 2370/29; B60K 2370/77; B60K 2370/155; B60K 2370/334; B60K 2370/167; B60K 2370/166; B60K 2370/177; B60K 2370/31; B60K 2370/785; B60K 2370/66;
(Continued)

(56) References Cited

U.S. PATENT DOCUMENTS 4,582,389 A * 4/1986 Wood ................. G02B 27/0103
345/7
5,710,646 A * 1/1998 Kimura .............. G02B 27/0103
359/13
(Continued)

FOREIGN PATENT DOCUMENTS

CN 1525210 A 9/2004
JP 2009-008722 A 1/2009
(Continued)

*Primary Examiner* — Stephone B Allen
*Assistant Examiner* — Jyotsna V Dabbi
(74) *Attorney, Agent, or Firm* — Seed IP Law Group LLP (57) ABSTRACT

A heads-up display device includes a display unit which outputs a 3D image and at least one holographic optical element which is attached to a windshield of the vehicle to diffract and reflect the 3D image output from the display unit so that a reflection efficiency of the 3D image may be improved while minimizing a module volume.

9 Claims, 8 Drawing Sheets

(52) U.S. Cl.
CPC ............... *B60K 2370/155* (2019.05); *B60K 2370/1531* (2019.05); *B60K 2370/29* (2019.05); *B60K 2370/77* (2019.05); *G02B 2027/0134* (2013.01)

(58) Field of Classification Search
CPC .......... B60K 2370/52; B60K 2370/736; B60K 2370/73; B60K 2370/70; B60R 2300/205; B60R 2300/207; B60R 2300/308; B60R 2300/302; B60R 1/00; G06T 19/00; G06T 19/003; G06T 19/006; G06F 3/011; G06F 3/016; G06F 3/013; G06K 9/00671
USPC .......................................................... 359/14
See application file for complete search history.

(56) References Cited

U.S. PATENT DOCUMENTS

| | | | | |
|---|---|---|---|---|
| 6,407,724 | B2* | 6/2002 | Waldern | ............... G02B 5/1885 |
| | | | | 345/7 |
| 6,906,836 | B2* | 6/2005 | Parker | ..................... G02B 5/32 |
| | | | | 359/15 |
| 2004/0165264 | A1* | 8/2004 | Uehara | .................. H04N 13/31 |
| | | | | 359/462 |
| 2017/0054973 | A1* | 2/2017 | Kasazumi | ............. G02B 30/34 |

FOREIGN PATENT DOCUMENTS

| | | | | |
|---|---|---|---|---|
| JP | 5534009 B2 | 6/2014 | | |
| KR | 10-2013-0062323 A | 6/2013 | | |
| WO | WO-2017011799 A1 * | 1/2017 | ......... | G02B 27/0103 |

\* cited by examiner

HEADS-UP DISPLAY DEVICE

CROSS-REFERENCE TO RELATED APPLICATIONS

This application claims the priority of Korean Patent Application No. 10-2017-0181184 filed on Dec. 27, 2017, in the Korean Intellectual Property Office, the disclosure of which is incorporated herein by reference.

BACKGROUND

Technical Field

The present disclosure relates to a display device, and more particularly, to a heads-up display device which includes a holographic optical element.

Description of the Related Art

As the information society is developed, demands for display devices for displaying images are increased in various forms. Recently, various display devices such as a liquid crystal display device, a plasma display panel, and an organic light emitting display device are utilized.

Recently, as studies on a display device which is applied to a vehicle are actively performed, a heads-up display device (HUD) is attracting attention as one of various systems which are being developed as a medium which promotes safety of a driver during driving and effectively transmits vehicle driving information and surrounding situation information to the user.

Such a heads-up display device provides vehicle driving information or other information in the front of a driver, that is, in a range without exceeding a main field of vision of the driver, while driving a vehicle or an aircraft.

For example, a heads-up display device for a vehicle displays information (a speed, a mileage, or an RPM (revolutions per minute)) of a dashboard on a main visual line of sight of the driver so that the driver may easily catch driving information while driving the vehicle. Therefore, the driver recognizes important driving information without moving driver's eyes out from the road so that the driver may safely drive the vehicle.

Such a normal heads-up display device reflects images on a windshield of a vehicle to output the images to the eyes of the driver so that there is a problem in that the driving information is not clearly displayed due to low reflectance of the windshield. Further, in order to ensure an optical path of the image, an optical system including a plurality of optical elements needs to be provided in the dash board of the vehicle so that there is a restriction that a space for ensuring a module volume of the heads-up display device is required.

BRIEF SUMMARY

Therefore, an object to be achieved by the present disclosure is to provide a heads-up display device having a minimized module structure and volume.

Objects of the present disclosure are not limited to the above-mentioned objects, and other objects, which are not mentioned above, can be clearly understood by those skilled in the art from the following descriptions.

According to an aspect of the present disclosure, a heads-up display device includes a display unit which outputs a three-dimensional (3D) image and at least one holographic optical element which is attached to a windshield of the vehicle to diffract and reflect the 3D image output from the display unit so that a reflection efficiency of the 3D image may be improved while minimizing a module volume.

Other detailed matters of the exemplary embodiments are included in the detailed description and the drawings.

According to the present disclosure, a module volume is minimized so that a space for installing a heads-up display device is minimized, thereby increasing a space utilization of the vehicle.

Further, according to the present disclosure, a 3D image output from a display unit is efficiently reflected to the eyes of the driver so that the driver more clearly recognizes the 3D image, thereby increasing driving safety.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto.

Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, the layer or element may be disposed directly on the other element or one or more other layers or elements may be interposed therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 1:
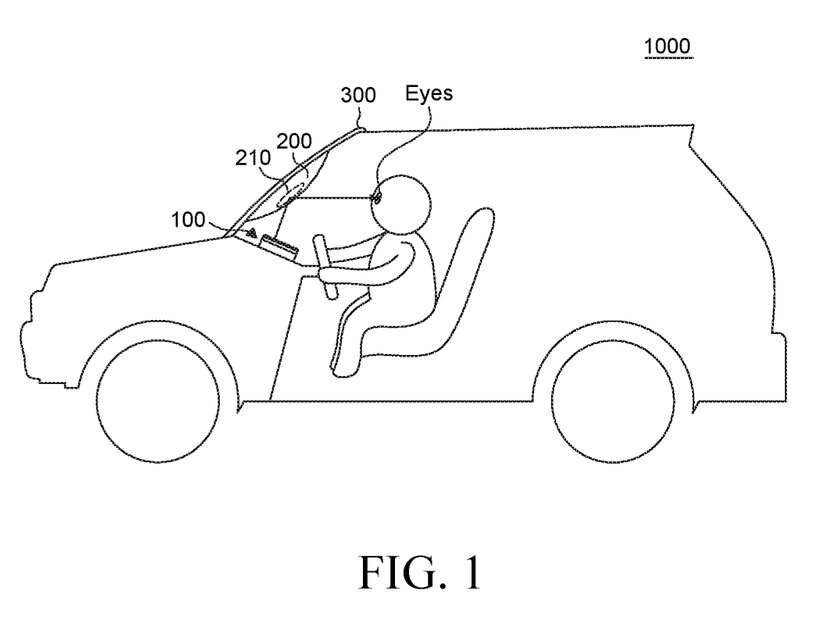
FIG. 1 is a schematic diagram for explaining a heads-up display device according to an exemplary embodiment of the present disclosure.

FIG. 1 is a schematic diagram for explaining a heads-up display device according to an exemplary embodiment of the present disclosure.

A heads-up display device (HUD) 1000 according to an exemplary embodiment of the present disclosure includes a display unit 100 which outputs driving information, such as a speed, an RPM, or navigation, as a 3D image which represents a depth feeling and view in the visual field, and a holographic optical element (HOE) 200 which is attached to the windshield 300 to diffract and reflect the 3D image output from the display unit 100, for example using at least one diffraction grating 210, and secure a focal distance of the 3D image. For example, the windshield 300 is attached to a front surface of the vehicle to secure an external field of vision so that the user recognizes surrounding vehicles and a road situation.

The windshield 300 also reflects the 3D image output from the display unit 100 to the driver. To this end, the windshield 300 may be manufactured by a transparent glass or film to secure an external field of vision and a reflective material having high reflectance may be coated on a surface of the windshield 300 to allow the windshield 300 to serve as a concave mirror.

The holographic optical element 200 may be in the form of a convex lens having the same curvature as a curvature of the windshield 300 which is in the form of a concave mirror. As described above, the curvature of the windshield 300 and the curvature of the holographic optical element 200 are set to be the same, so that the holographic optical element 200 and the windshield 300 may be attached to abut each other. Therefore, a gap between the holographic optical element 200 and the windshield 300 is not generated, so that a 3D image output from the display unit 100 may be sent to the driver without being distorted.

Further, the holographic optical element 200 is formed in the form of a convex lens to serve as an optical system of the related art. Specifically, the heads-up display device of the related art includes a plurality of optical elements such as a convex mirror and a concave mirror in order to secure an optical path of the 3D image output from the display unit. However, the heads-up display device 1000 according to an exemplary embodiment of the present disclosure may replace the role of the plurality of optical elements such as the convex mirror and the concave mirror with the convex lens-shaped holographic optical element 200.

Therefore, since the heads-up display device according to the exemplary embodiment of the present disclosure minimizes the module volume, a space for installing the heads-up display device is minimized to increase the space utilization of the vehicle.

However, the curvature of the holographic optical element 200 needs to be designed in consideration of the optical paths of the 3D image output from the display unit 100 of the heads-up display device 1000 and the driver and thus the curvature of the windshield 300 may be also correspondingly changed.

Figure 2:
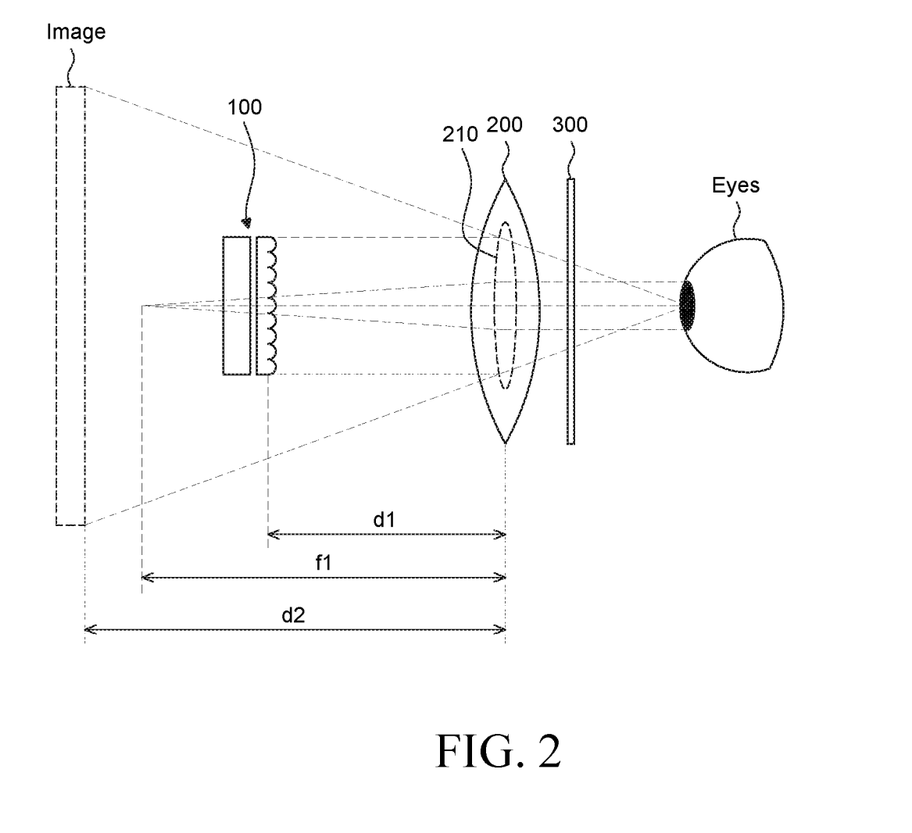
FIG. 2 is a view for explaining an optical path of a 3D image output from a heads-up display device according to an exemplary embodiment of the present disclosure.

FIG. 2 is a view for explaining an optical path of a 3D image output from a heads-up display device according to an exemplary embodiment of the present disclosure.

That is, in FIG. 2, in consideration of a path where the 3D image output from the display unit 100 is reflected by the holographic optical element 200 and the windshield 300, an optical path of the diffracted 3D image is horizontally illustrated.

Referring to FIG. 2, the windshield 300, the holographic optical element 200, and the display unit 100 are disposed in one line with respect to eyes of the driver and a virtual image of the 3D image is formed at a rear side of the display unit 100.

Specifically, the 3D image is output toward the holographic optical element 200 from the display unit 100. The optical path of the 3D image output as described above is diffracted toward the eyes of the driver due to the convex lens-shaped holographic optical element 200. Therefore, the 3D image is focused on the eyes of the driver through the windshield 300.

Here, since a distance d1 between the display unit 100 and the holographic optical element 200 is shorter than a focal distance f1 of the holographic optical element 200, an erect virtual image is formed at the rear side of the display unit 100.

More specifically, the distance d1 between the display unit 100 and the holographic optical element 200, the focal distance f1 of the holographic optical element 200, and a distance d2 between the holographic optical element 200 and the erect virtual image have the relationship as represented in Equation 1.

$$\frac{1}{d1} - \frac{1}{d2} = \frac{1}{f1} \qquad \text{Equation 1}$$

Here, since there is a restriction in the distance of the dash board and the windshield 300 due to the limitation of the size of the inside of the vehicle, there is a limitation in changing the distance d1 between the display unit 100 and the holographic optical element 200. Therefore, in order to adjust the distance d2 between the holographic optical element 200 and the erect virtual image, the curvature of the holographic optical element 200 may be appropriately changed to simultaneously change the output of the 3D image and the focal distance f1 of the holographic optical element 200.

Figure 3:
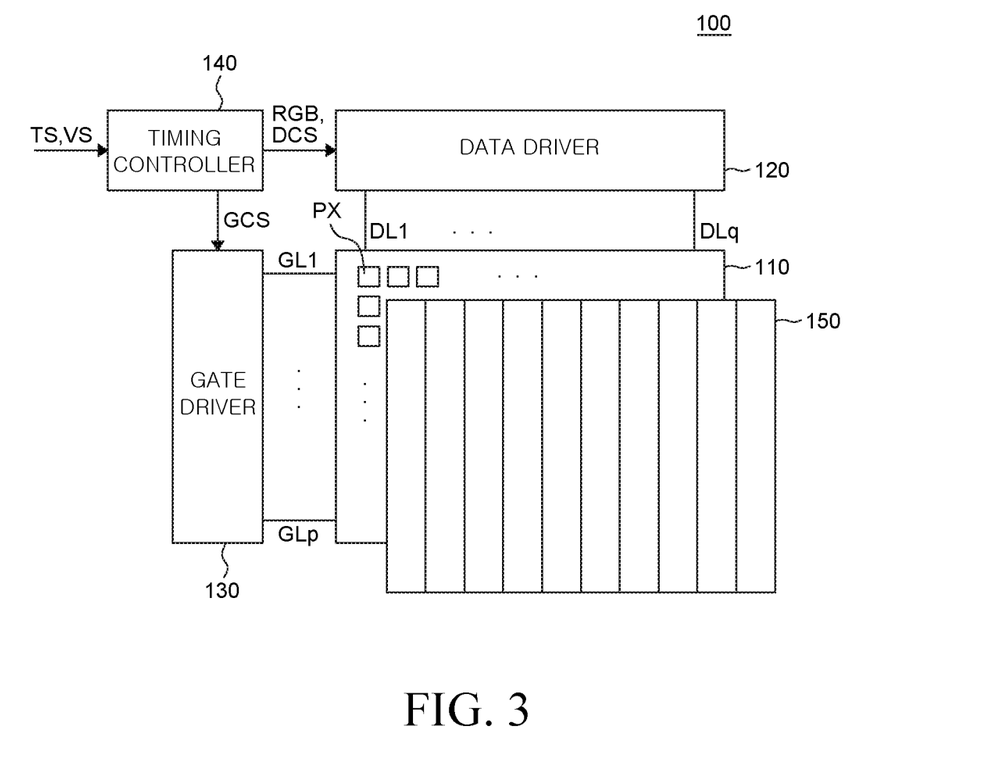
FIG. 3 is a schematic diagram for explaining a display unit of a heads-up display device according to an exemplary embodiment of the present disclosure.

FIG. 3 is a schematic diagram for explaining a display unit of a heads-up display device according to an exemplary embodiment of the present disclosure.

Referring to FIG. 3, a display device 100 includes a display panel 110, a data driver 120, a gate driver 130, a timing controller 140, and a lenticular lens plate 150.

The display panel 110 includes a plurality of gate lines GL1 to GLp and a plurality of data lines DL1 to DLq which intersect each other in a matrix on the substrate made from glass or plastic. A plurality of pixels PX is defined at the intersections of the plurality of gate lines GL1 to GLp and the plurality of data lines DL1 to DLq. Here, p and q are natural numbers.

Each pixel PX includes a plurality of sub pixels R, G, and B and each sub pixel R, G, B may implement light of a specific color. For example, the plurality of sub pixels R, G, and B may be configured by a red sub pixel R which implements red, a green sub pixel G which implements green, and a blue sub pixel B which implements blue, but is not limited thereto. Each of the plurality of sub pixels is connected to at least one transistor.

Further, when the display unit 100 of the heads-up display device 1000 according to the exemplary embodiment of the present disclosure is a liquid crystal display device, a gate electrode of the transistor is connected to the gate lines GL1 to GLp, a source electrode is connected to the data lines DL1 to DLq, and a drain electrode is connected to the plurality of sub pixels R, G, B to control a voltage which is applied to the plurality of sub pixels. By doing this, movement of the liquid crystal provided in the plurality of sub pixels R, G, and B is controlled to implement a gray scale of the liquid crystal display device.

As described above, the display device 100 is not limited to the liquid crystal display device, but may be various types of display devices such as an organic light emitting display device.

The timing controller 140 supplies various control signals DCS (data control signal) and GCS (gate control signal) and image data RGB to the data driver 120 and the gate driver 130 to control the data driver 120 and the gate driver 130.

Specifically, the timing controller 140 starts scanning in accordance with a timing implemented by each frame, based on a timing signal TS received from an external host system. The timing controller 140 converts an image signal VS received from the external host system in accordance with a data signal format which is processable in the data driver 120 and outputs the converted image data RGB. By doing this, the timing controller 140 controls data driving at an appropriate timing in accordance with the scanning.

The timing controller 140 receives various timing signals TS including a vertical synchronization signal Vsync, a horizontal synchronization signal Hsync, a data enable signal DE, and a data clock signal DCLK together with the image signal VS, from the external host system.

In order to control the data driver 120 and the gate driver 130, the timing controller 140 receives the timing signal TS such as the vertical synchronization signal Vsync, the horizontal synchronization signal Hsync, the data enable signal DE, and the data clock signal DCLK and generates various control signals DCS and GCS. The timing controller 140 outputs the various control signals DCS and GCS to the data driver 120 and the gate driver 130.

For example, in order to control the gate driver 130, the timing controller 140 outputs various gate control signals GCS including a gate start pulse GSP, a gate shift clock GSC, and a gate output enable signal GOE.

Here, the gate start pulse controls an operation start timing of one or more gate circuits which configure the gate driver 130. The gate shift clock is a clock signal which is commonly input to one or more gate circuits and controls a shift timing of the scan signal (gate pulse). The gate output enable signal designates timing information of one or more gate circuits.

Further, in order to control the data driver 120, the timing controller 140 outputs various data control signals DCS including a source start pulse SSP, a source sampling clock SSC, and a source output enable signal SOE.

Here, the source start pulse controls a data sampling start timing of one or more data circuits which configure the data driver 120. The source sampling clock is a clock signal which controls a sampling timing of data in each data circuit. The source output enable signal controls an output timing of the data driver 120.

The timing controller 140 may be disposed on a control printed circuit board which is connected to a source printed circuit board to which the data driver 120 is bonded, through a connecting medium such as a flexible flat cable FFC or a flexible printed circuit FPC.

In the control printed circuit board, a power controller which supplies various voltages or currents to the display panel 110, the data driver 120, and the gate driver 130 or controls various voltages or currents to be supplied may be further disposed. The power controller may also be referred to as a power management integrated circuit PMIC.

The source printed circuit board and the control printed circuit board described above may be configured as one printed circuit board.

The gate driver 130 sequentially supplies high level or low level gate signals to the gate lines GL1 to GLp in accordance with the control of the timing controller 140.

According to a driving method, the gate driver 130 may be located only at one side of the display panel 110 or located at both sides as necessary.

The gate driver 130 may be connected to a bonding pad of the display panel 110 by means of a tape automated bonding TAB method or a chip on glass COG method. The gate driver 130 may be implemented as a gate in panel GIP type to be directly disposed in the display panel 110 or may be integrated on the display panel 110, as necessary.

The gate driver 130 may include a shift register and a level shifter.

The data driver 120 converts image data RGB received from the timing controller 140 into an analog data voltage Vdata to output the converted analog data voltage to the data lines DL1 to DLq.

The data driver 120 is connected to a bonding pad of the display panel 110 by a tape automated bonding method or a chip on glass method or may be directly disposed on the display panel 110. As necessary, the data driver 120 may be disposed to be integrated in the display panel 110.

Further, the data driver 120 may be implemented by a chip on film COF method. In this case, one end of the data driver 120 may be bonded to at least one source printed circuit board and the other end may be bonded to the display panel 110.

The data driver 120 may include a logic unit including various circuits such as a level shifter or a latch unit, a digital analog converter DAC, and an output buffer.

Figure 4:
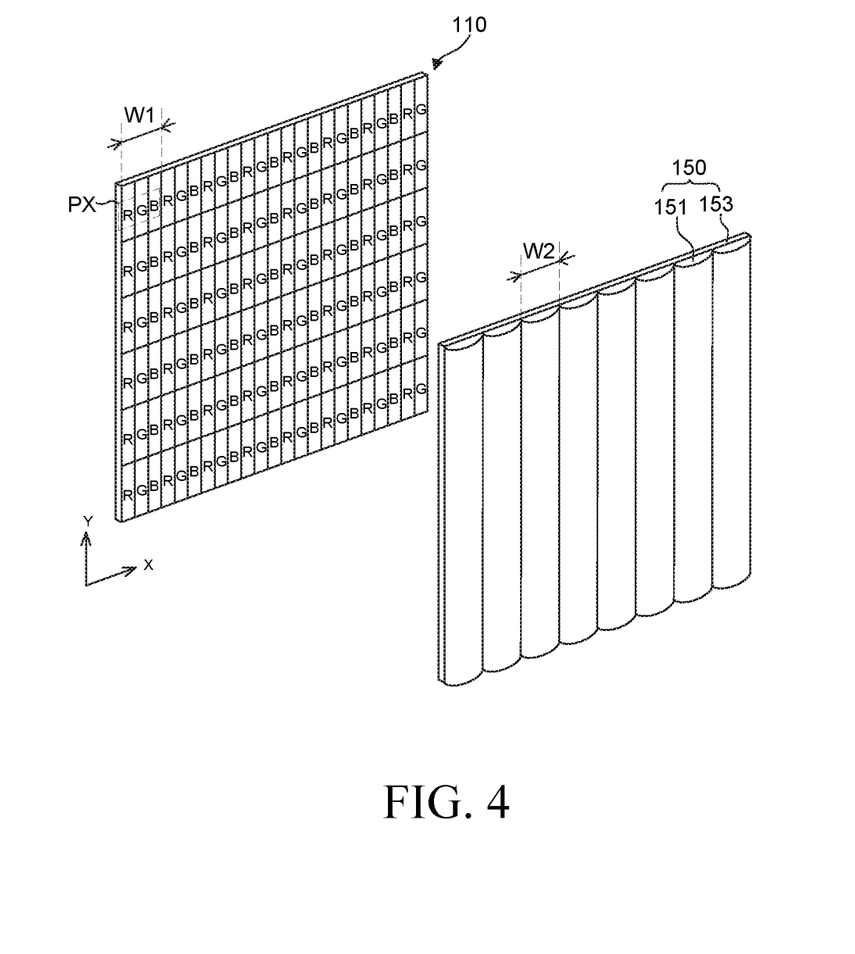
FIG. 4 is a view for explaining an arrangement of a display panel and a lenticular lens plate of a heads-up display device according to an exemplary embodiment of the present disclosure.

The lenticular lens plate 150 is disposed on a front surface of the display panel 110 and includes a plurality of lenticular lenses 151 having a predetermined width W2, as shown in FIG. 4.

Figure 5:
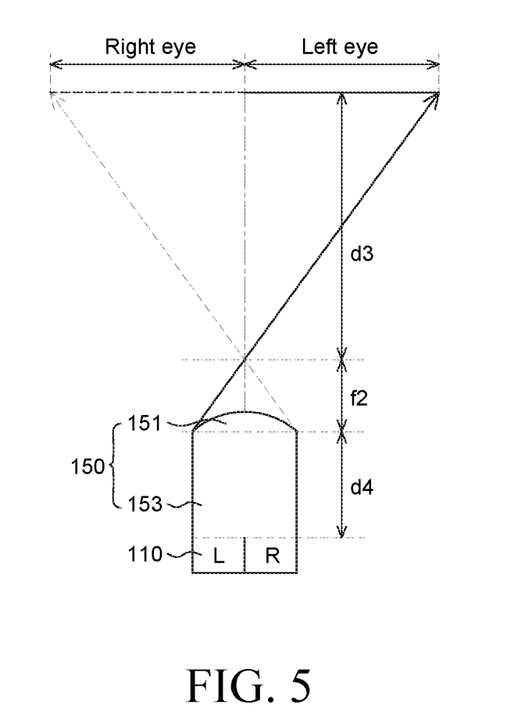
FIG. 5 is a view for explaining an output method of a 3D image by a lenticular lens.

FIG. 4 is a view for explaining an arrangement of a display panel and a lenticular lens plate of a heads-up display device according to an exemplary embodiment of the present disclosure and FIG. 5 is a view for explaining an output method of a 3D image by a lenticular lens.

Referring to FIG. 4, in the lenticular lens plate 150, a plurality of lenticular lenses 151 extending in a longitudinal direction (a y-axis direction) of the sub pixels R, G, and B is disposed in a lateral direction (an x-axis direction) of the sub pixels R, G, and B. A horizontal width W2 of the lenticular lens 151 along the lateral direction (x-axis direction) of the sub pixels R, G, and B may be set to be an integer multiple of a horizontal width W1 of the pixel PX including the sub pixels R, G, and B. In some embodiments, the integer multiple is one.

That is, the lenticular lenses 151 may be designed to correspond to each of the pixels PX including the plurality of sub pixels R, G, and B. Alternatively, the lenticular lenses 151 may be designed to correspond to the plurality of sub pixels R, G, and B, respectively.

In some exemplary embodiments, the lenticular lens 151 provided in the lenticular lens plate 150 may be disposed to be inclined with respect to the longitudinal direction of the sub pixels R, G, and B at a predetermined angle.

Referring to FIG. 5, the lenticular lens plate 150 disposed on the front surface of the display panel 110 is configured to include a plurality of lenticular lenses 151 in which an upper surface has a convex lens shape, on a flat gap glass 153.

The display panel 110 corresponding to one lenticular lens 151 includes a pixel L which outputs a left eye image and a pixel R which outputs a right eye image. The lenticular lens plate 150 serves to split the left and right eye images output from the display panel 110. Images corresponding to the left and right eyes are output to the left eye and the right eye at an appropriate 3D viewing distance d3 from the lenticular lens plate 150.

Therefore, the image which transmits the display panel 110 passes through the lenticular lens plate 150 to input different images to the left and right eyes of the driver so that the driver may recognize the 3D image through binocular disparity.

In the display unit 100, the display panel 110 and the lenticular lens plate 150 are supported by an instrument (not illustrated) so that the display panel 110 and the lenticular lens plate 150 are spaced apart from each other with a predetermined interval (a rear distance: d4). The appropriate 3D viewing distance d3, the rear distance d4 and the lens focal distance f2 have the relationship as represented in Equation 2.

$$\frac{1}{d3} + \frac{1}{d4} = \frac{1}{f2} \qquad \text{Equation 2}$$

In this case, the appropriate 3D viewing distance d3 is designed to be 30 to 60 cm depending on an actual application model, by Equation 2, but the lens focal distance f2 may be 0.2 to 1 mm which is very small as compared with the 3D viewing distance. Therefore, the actual lens rear distance d4 is almost similar to the lens focal distance f2 at an incident side. Therefore, in order to maintain a constant rear distance d4, a gap glass 153 needs to be inserted in the lenticular lens plate 150.

It has been described that the heads-up display device 1000 according to the exemplary embodiment of the present disclosure implements the 3D image by disposing the lenticular lens plate 150 on the front surface of the display panel 110.

Figure 6:
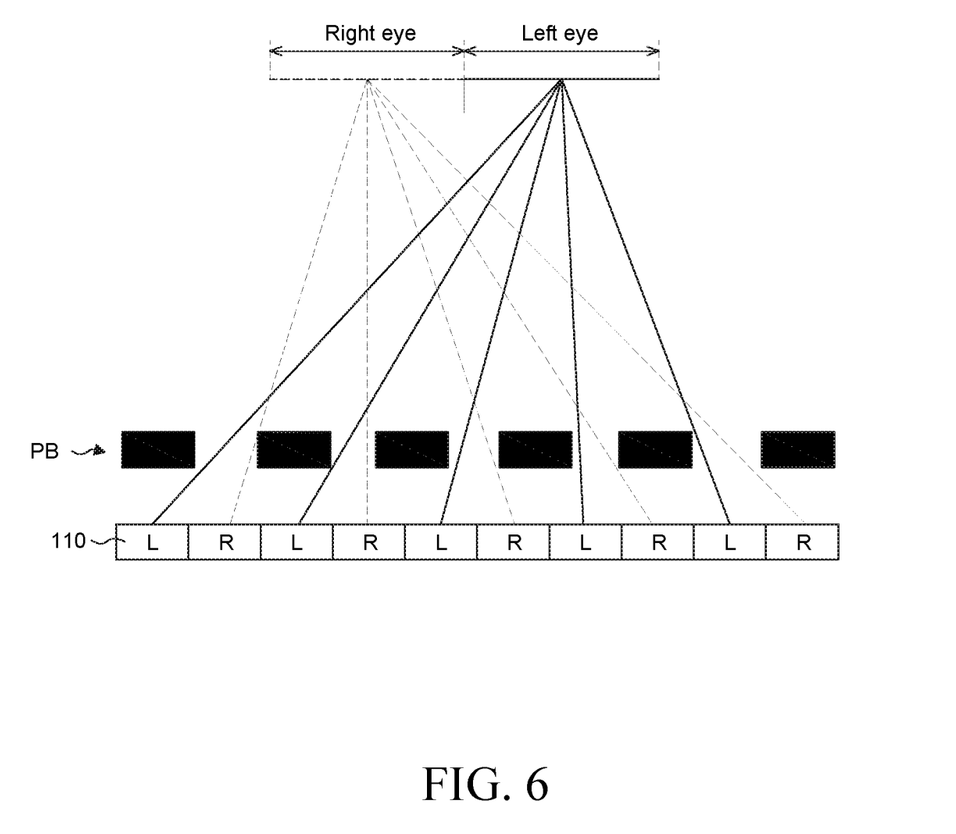
FIG. 6 is a view for explaining an output method of a 3D image by a parallax barrier.

FIG. 6 is a view for explaining an output method of a 3D image by a parallax barrier;

Referring to FIG. 6, in some exemplary embodiments, the heads-up display device 1000 includes a parallax barrier PB including a plurality of slits on the front surface of the display panel 110 to split the left eye image and the right eye image to implement the 3D image.

Specifically, the left eye image displayed in at least one of left eye pixels L of the display panel 110 reaches the left eye of the driver via the slit of the parallax barrier PB and the right eye image displayed in at least one of right eye pixels R of the display panel 110 reaches the right eye of the driver via the slit of the parallax barrier PB. In this case, separate images are included in the left eye and right eye images in consideration of the binocular disparity and the driver combines two images to recognize the 3D image.

Figure 7:
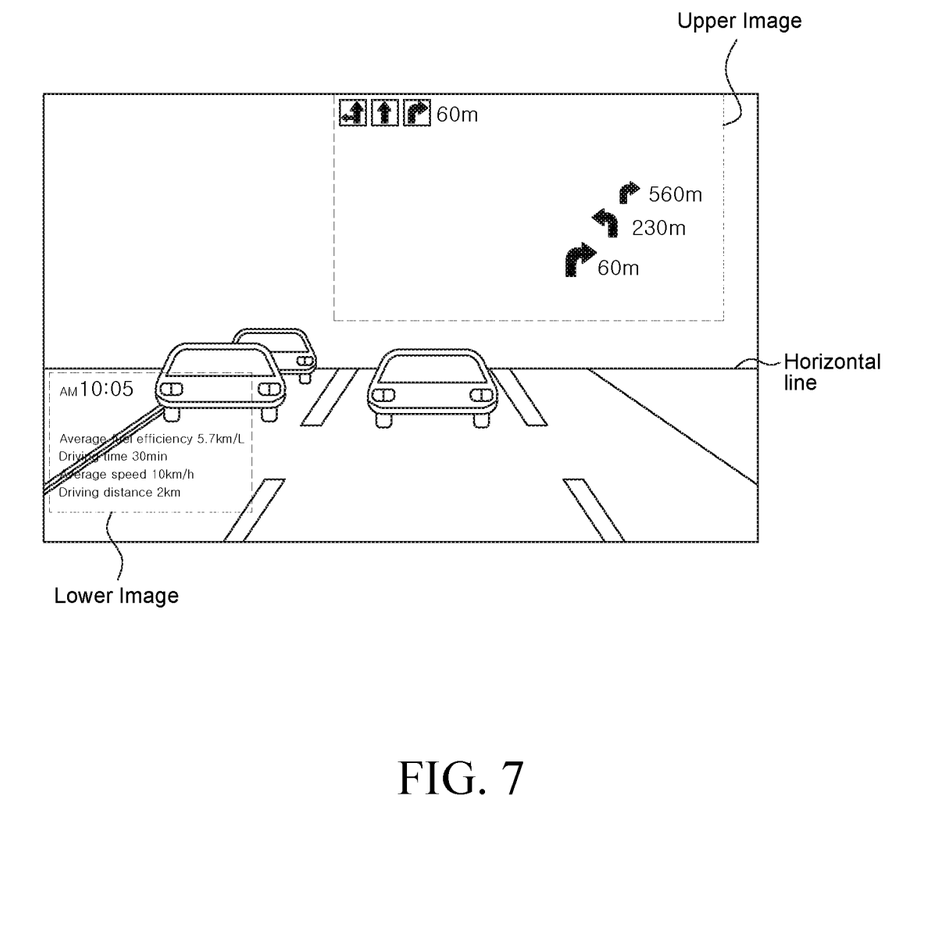
FIG. 7 is a view illustrating a 3D image output from a display unit of a heads-up display device according to an exemplary embodiment of the present disclosure.

FIG. 7 is a view illustrating a 3D image output from a display unit of a heads-up display device according to an exemplary embodiment of the present disclosure.

In the heads-up display device 1000 according to the exemplary embodiment of the present disclosure, the display unit 100 outputs the 3D image to represent a plurality of images to provide a visual image of different depths, thus providing a depth feeling for the viewer.

As illustrated in FIG. 7, driving information such as lane information and navigation is displayed in an upper portion with respect to the horizontal line and driving information such as a speed, fuel efficiency, and mileage is displayed in a lower portion with respect to the horizontal line.

Here, in the case of driving information such as lane information and navigation displayed on the upper portion with respect to the horizontal line, the 3D image provided in the upper portion may be output to allow the driver to focus on a location spaced apart at a distance from the vehicle. In particular, the 3D image provided in the upper portion may have a three-dimensional depth that is greater than a three-dimensional depth of the 3D image in the lower portion. Some objects appearing in the 3D image of the upper portion may appear to be spaced apart at a first distance from the vehicle and other objects may appear to be spaced apart from the vehicle at a second distance different than the first distance. The greater three-dimensional depth of the upper portion may be the result of, for example, providing a different parallax for some objects than other objects.

In contrast, in the case of driving information such as the speed, the fuel efficiency, and the mileage displayed on the lower portion with respect to the horizontal line, the 3D image provided in the lower portion may be output to allow the driver to focus on a location close to the vehicle. In particular, the 3D image provided in the lower portion may have a three-dimensional depth that is less than the 3D image provided in the upper portion. Objects appearing in the 3D image of the lower portion may therefore have a three-dimensional depth that is less than objects of the 3D image provided in the upper portion such that the objects in the lower portion appear to be positioned closer together in distance. The three-dimensional depth of the lower portion may be the result, for example, of providing a similar parallax for objects displayed in the lower portion.

When the driver views an upper image, the driver sees vehicles and structures which are relatively far away, so that a focus of the eyes becomes farther away. Therefore, the heads-up display device 1000 according to the exemplary embodiment of the present disclosure deeply displays the depth feeling of the 3D image in accordance therewith. In contrast, when the driver views a lower image, the driver sees vehicles and roads which are relatively close, so that a focus of the eyes becomes close. Therefore, the heads-up display device 1000 according to the exemplary embodiment of the present disclosure shallowly displays the depth feeling of the 3D image in accordance therewith. Namely, the driver perceives that the 3D image displayed in the upper portion has a deeper three-dimensional depth than the 3D image displayed in the lower portion.

By doing this, the focus of the driver and the focus of the 3D image match, so that the driver may recognize the more distinct and clearer 3D image.

However, the driving information displayed on the upper and lower portions with respect to the horizontal line which has been described as an example may vary. Further, the upper image and the lower image are used to explain two images for the convenience of description so that the present disclosure is not limited thereto and intermediate images with various focuses may be inserted between the upper image and the lower image.

Figure 8:
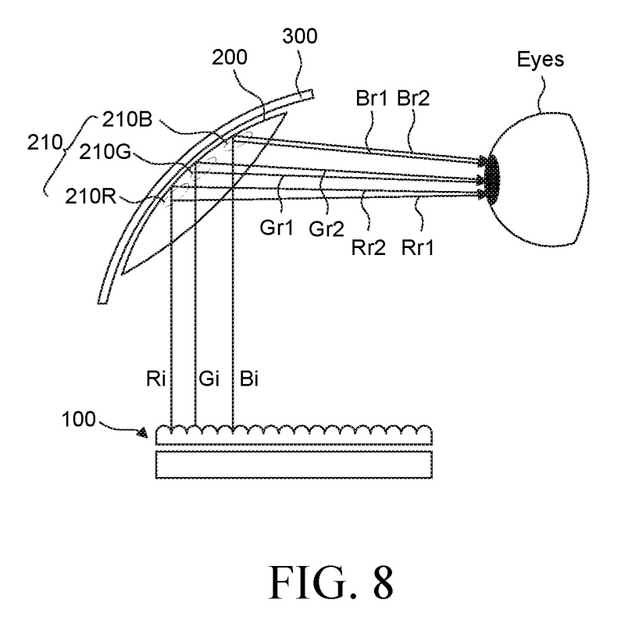
FIG. 8 is a view for explaining an optical path at every wavelength of a 3D image output from a heads-up display device according to an exemplary embodiment of the present disclosure.

FIG. 8 is a view for explaining an optical path at every wavelength of a 3D image output from a heads-up display device according to an exemplary embodiment of the present disclosure.

FIG. 8 illustrates that a red optical path, a green optical path, and a blue optical path of the 3D image output from the display unit 100 illustrated in FIG. 1 is reflected to the eyes of the driver via the holographic optical element 200 and the windshield 300.

The holographic optical element 200 according to the exemplary embodiment of the present disclosure is a convex lens including a reflective diffraction grating 210 having a peak wavelength selectivity.

For example, as illustrated in FIG. 8, the holographic optical element 200 according to the exemplary embodiment of the present disclosure includes a red diffraction grating 210R having a wavelength selectivity for red light, a green diffraction grating 210G having a wavelength selectivity for green light, and a blue diffraction grating 210B having a wavelength selectivity for blue light.

The 3D image having a plurality of wavelengths output from the display unit 100 is reflected toward the driver by the reflective diffraction grating 210 having a peak wavelength selectivity and the external light entering through the windshield 300 is diffracted to be transmitted to the driver by the convex lens. Therefore, the holographic optical element 200 according to the exemplary embodiment of the present disclosure serves as a combiner which performs both the reflecting and transmitting functions.

The refracting function of the holographic optical element 200 has been described with reference to FIG. 2 so that hereinafter, a reflecting function of the holographic optical element 200 will be mainly described with reference to FIG. 8.

As illustrated in FIG. 8, the 3D image output from the display unit 100 may be a 3D image having red, green, and blue wavelengths. That is, red incident light Ri, green incident light Gi, and blue incident light Bi are separately incident onto the holographic optical element 200.

The red incident light Ri is partially reflected by the red diffraction grating 210R having a wavelength selectivity for red light recorded in the holographic optical element 200 to be output to the eyes of the driver as first red reflection light Rr1. Further, the red incident light Ri which is not reflected by the red diffraction grating 210R is reflected by the windshield 300 to be output to the eyes of the driver as second red reflection light Rr2.

Similarly, the green incident light Gi and the blue incident light Bi are partially reflected by the green and blue diffraction gratings 210G and 210B having a wavelength selectivity for green light and blue light recorded in the holographic optical element 200 to be output to the eyes of the driver as first green reflection light Gr1 and first blue reflection light Br1. Further, the green incident light Gi and the blue incident light Bi which are not reflected by the green and blue diffraction gratings 210G and 210B are reflected by the windshield 300 to be output to the eyes of the driver as second green reflection light Gr2 and second blue reflection light Br2.

As described above, even though it is described that in the heads-up display device 1000 according to the exemplary embodiment of the present disclosure, one holographic optical element 200 includes the plurality of diffraction gratings 210 having a wavelength selectivity, the present disclosure is not limited thereto. In some exemplary embodiments, a plurality of holographic optical elements 200 may be disposed and each of the plurality of holographic optical elements 200 may include a diffraction grating 210 having one wavelength selectivity.

Additionally, a holographic recording principle of the heads-up display device 1000 according to an exemplary embodiment of the present disclosure is to split light beam emitted from a laser into two portions of light so that one portion of light directly illuminates the screen and the other portion of light illuminates an object to be watched by a driver. In this case, the light which directly illuminates the screen is referred to as a reference light and the light which illuminates the object is referred to as an object light. The object light is light reflected from each surface of the object so that the phase difference (a distance from a surface of the object to the screen) may vary depending on the surface of the object. In this case, the reference light which is not distorted interferes with the object light and the interference fringe at this time is recorded in the form of a diffraction grating.

As described above, the heads-up display device according to the exemplary embodiment of the present disclosure includes a holographic optical element so that the 3D image may be reflected not only by the windshield, but also by the diffraction grating of the holographic optical element.

Therefore, according to the present disclosure, a 3D image output from a display unit is efficiently reflected to the eyes of the driver so that the driver more clearly recognizes the 3D image, thereby increasing driving safety.

The exemplary embodiments of the present disclosure can also be described as follows:

According to an aspect of the present disclosure, a heads-up display device includes a display unit which outputs a 3D image and at least one holographic optical element which is attached to a windshield of the vehicle to diffract and reflect the 3D image output from the display unit so that a reflection efficiency of the 3D image may be improved while minimizing a module volume.

The at least one holographic optical element may have a convex lens shape.

The windshield may have a concave mirror shape.

A curvature of the windshield may be equal to a curvature of the at least one holographic optical element.

Each of the at least one holographic optical element may include one or more diffraction gratings each having a wavelength selectivity.

The plurality of diffraction gratings may be a reflective type.

The display unit may include a display panel including at least one of left eye pixels and at least one of right eye pixels, and a lenticular lens plate disposed on a front surface of the display panel.

The display unit includes a display panel including at least one of left eye pixels and at least one of right eye pixels, and a parallax barrier including a plurality of slits disposed on a front surface of the display panel.

The lenticular lens plate may include a plurality of lenticular lenses and a width of each of the plurality of lenticular lenses is an integer multiple of a sum of a width of one of the at least one of left eye pixels and a width of one of the at least one of right eye pixels.

The display unit displays such that a depth of a 3D image which is output to a lower portion of the windshield may be deeper than a depth of a 3D image which is output to an upper portion of the windshield.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A heads-up display device, comprising:
   a display unit configured to output a three-dimensional image; and
   at least one holographic optical element attached to a windshield of a vehicle to diffract and reflect the three-dimensional image from the display unit,
   wherein the windshield has a concave mirror shape which has a surface concave to an inside of the windshield, and
   wherein the at least one holographic optical element has a convex lens shape which has a surface convex to the inside of the windshield,
   wherein each of the at least one holographic optical element includes a red diffraction grating having a wavelength selectivity for red light, a green diffraction grating having a wavelength selectivity for green light, and a blue diffraction grating having a wavelength selectivity for blue light,
   wherein the display unit displays a first three-dimensional image that is output to an upper portion of the windshield has a three-dimensional depth that is deeper than a three-dimensional depth of a second three-dimensional image that is output to a lower portion of the windshield,
   wherein the first three-dimensional image that is output to the upper portion of the windshield and the second three-dimensional image that is output to the lower portion of the windshield are divided with respect to a horizontal line, and
   wherein a curvature of the windshield is equal to a curvature of the at least one holographic optical element.

2. The heads-up display device according to claim 1, wherein the one or more diffraction gratings are reflective.

3. The heads-up display device according to claim 1, wherein the display unit includes a display panel including at least one of left eye pixels and at least one of right eye pixels, and a lenticular lens plate disposed on a front surface of the display panel.

4. The heads-up display device according to claim 3, wherein the lenticular lens plate includes a plurality of lenticular lenses and a width of each of the plurality of lenticular lenses is an integer multiple of a sum of a width of one of the at least one of left eye pixels and a width of one of the at least one of right eye pixels.

5. The heads-up display device according to claim 1, wherein the display unit includes a display panel including at least one of left eye pixels and at least one of right eye pixels, and a parallax barrier including a plurality of slits disposed on a front surface of the display panel.

6. The heads-up display device according to claim 1, wherein the windshield is configured to reflect light from the at least one holographic optical element, the light from the at least one holographic optical element including at least one of the red light, the green light, or the blue light that is unreflected by the at least one holographic optical element, and
   wherein the at least one holographic optical element is configured to:
      transmit light reflected by at least one of the red diffraction grating, the green diffraction grating, or the blue diffraction grating, and
      transmit the light reflected by the windshield.

7. The heads-up display device according to claim 1, wherein the surface of the convex lens shape convex to the inside of the windshield includes an exposed surface.

8. The heads-up display device according to claim 1, wherein the at least one holographic optical element is configured to reflect red light in the three-dimensional image, green light in the three-dimensional image, and blue light in the three-dimensional image.

9. The heads-up display device according to claim 8, wherein the windshield is configured to:
  reflect the red light in the three-dimensional image that is not reflected by the at least one holographic optical element, the red light in the three-dimensional image from the at least one holographic optical element;
  reflect the green light in the three-dimensional image that is not reflected by the at least one holographic optical element, the green light in the three-dimensional image from the least one holographic optical element; and
  reflect the blue light in the three-dimensional image that is not reflected by the at least one holographic optical element, the blue light in the three-dimensional image from the at least one holographic optical element.

* * * * *